US009128622B1

(12) United States Patent
Yang et al.

(10) Patent No.: US 9,128,622 B1
(45) Date of Patent: Sep. 8, 2015

(54) NETWORK VIRTUALIZATION-AWARE DATA STORAGE SYSTEM

(71) Applicant: EMC Corporation, Hopkinton, MA (US)

(72) Inventors: Ziye Yang, Shanghai (CN); Lintao Wan, Shanghai (CN); Chenhui Fan, Shanghai (CN); Xi Chen, Shanghai (CN); YinKee Yee, Newark, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/107,305

(22) Filed: Dec. 16, 2013

(51) Int. Cl.
*G06F 3/06* (2006.01)
(52) U.S. Cl.
CPC ............ *G06F 3/0619* (2013.01); *G06F 3/0665* (2013.01); *G06F 3/0689* (2013.01)
(58) Field of Classification Search
CPC ....... G06F 3/0689; G06F 3/067; G06F 3/061; G06F 11/1076
See application file for complete search history.

(56) References Cited

U.S. PATENT DOCUMENTS

| | | | |
|---|---|---|---|
| 7,606,868 B1* | 10/2009 | Le et al. | 709/211 |
| 2011/0035494 A1* | 2/2011 | Pandey et al. | 709/224 |
| 2012/0297381 A1* | 11/2012 | Ambat et al. | 718/1 |
| 2012/0324442 A1* | 12/2012 | Barde | 718/1 |

* cited by examiner

*Primary Examiner* — Farley Abad
(74) *Attorney, Agent, or Firm* — Ryan, Mason & Lewis, LLP

(57) ABSTRACT

A data storage system includes at least one network virtualization-aware switch. The data storage system also includes at least one storage array operatively coupled to the network virtualization-aware switch, wherein the storage array is operatively coupled to at least one host computing device, and wherein the host computing device instantiates at least one virtual machine in at least one virtual network. Further, the data storage system includes at least one controller operatively coupled to the network virtualization-aware switch, wherein the controller is configured to link the storage array with the virtual machine of the virtual network through the network virtualization-aware switch.

20 Claims, 4 Drawing Sheets

NETWORK VIRTUALIZATION-AWARE DATA STORAGE SYSTEM

FIELD

The field relates to computing systems implemented via a distributed virtual infrastructure, and more particularly to techniques for enabling network virtualization awareness in a data storage system so as to provide tenant-aware storage services in such a distributed virtual infrastructure.

BACKGROUND

In existing software defined data center (SDDC) implementations, there are multi-tenancy supports for software defined storage (SDS) and a software defined network (SDN), respectively. Multi-tenancy refers to a software architecture paradigm whereby a single instance of an application (functional software program) executes on a server which serves multiple tenants (multiple clients/customers). With a multi-tenant architecture, an application virtually partitions its data and configuration, and each tenant operates with a customized virtual application instance.

Traditionally, there are two typical usage cases to provision storage to applications: (i) directly exporting a block or file interface to applications; and (ii) delegating storage management to intermediate nodes.

In the first usage case (direct export), storage arrays/servers export storage via Internet Small Computer System Interface (iSCSI)/Network File System (NFS)/Common Internet File System (CIFS) to end users. The requirement of such usage is that the storage arrays/servers be connected to the application's network.

In the second usage case (intermediate node storage), sometimes the storage arrays/servers are designed to be hidden from applications for security issues. Moreover, the application's network may be dynamic and invisible to the storage (e.g., applications running on mobile devices). Thus, applications need not be aware of the storage arrays/servers. In a practical system, a hypervisor is a suitable candidate to serve as an intermediate node. When storage is provisioned to a hypervisor, applications (e.g., virtual machines (VMs)) request the storage (e.g., virtual disk) from the hypervisor. Thus, the storage arrays/servers do not need to be aware of the virtual network where the VMs reside. Unfortunately, file storage (NFS/CIFS) may not be available to the application (VMs) under such an approach.

Of course, storage arrays/servers can still serve applications in a virtual network with the assistance of a hypervisor, as described above in the second usage case. But under such a situation, it is the hypervisor vendor that dictates the storage requirements to storage vendors.

SUMMARY

Embodiments of the invention provide techniques for enabling network virtualization awareness in a data storage system so as to provide tenant-aware storage services in a distributed virtual infrastructure.

In one embodiment, a data storage system comprises at least one network virtualization-aware switch. The data storage system also comprises at least one storage array operatively coupled to the network virtualization-aware switch, wherein the storage array is operatively coupled to at least one host computing device, and wherein the host computing device instantiates at least one virtual machine in at least one virtual network. Further, the data storage system comprises at least one controller operatively coupled to the network virtualization-aware switch, wherein the controller is configured to link the storage array with the virtual machine of the virtual network through the network virtualization-aware switch.

In another embodiment, an article of manufacture comprises a processor-readable storage medium having encoded therein executable code of one or more software programs. The one or more software programs when executed by the at least one processing device implement operations of the above-described data storage system.

Advantageously, illustrative embodiments described herein provide techniques for integration of SDS and SDN/NV (network virtualization), i.e. attaching an allocated storage (e.g. a virtual iSCSI volume) to a tenant's private virtual network.

These and other features and advantages of the present invention will become more readily apparent from the accompanying drawings and the following detailed description.

DETAILED DESCRIPTION

Figure 1:
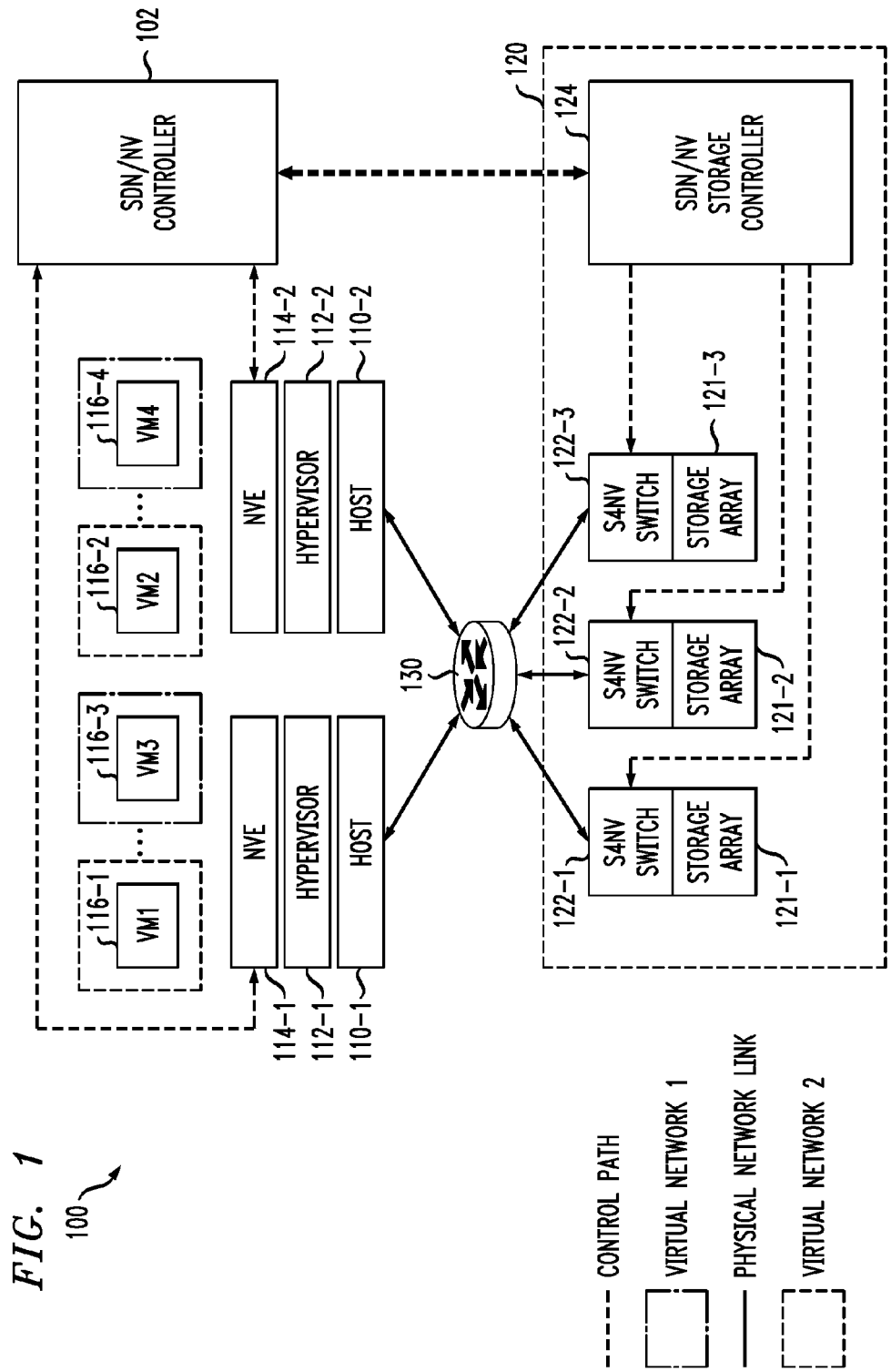
FIG. 1 illustrates a data center with a network virtualization-aware data storage system according to an embodiment of the invention.

Illustrative embodiments of the invention will be described herein with reference to exemplary computing systems and data storage systems, as well as associated servers, computers, storage units, computing devices, and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Embodiments of the invention realize that, in order change the situation whereby the hypervisor vendor dictates the storage requirements to storage vendors, storage products delivered by storage vendors have to meet new network challenges to deliver a high quality of storage services in a virtual network. In a traditional network, hosts and servers are deployed in the same network environment (Layer2 or Layer3), thus storage input/output (I/O) commands (e.g., commands of iSCSI) contained in network packets issued by the hosts can be naturally understood by the backend storage servers/arrays. But in a virtual network, the network packets originated by the VMs are encapsulated before transferring and de-capsulated upon receiving, which is performed by additional switches.

Accordingly, an illustrative embodiment of the invention provides an embedded switch in the data storage system to make the data storage system aware of the virtual network. Thus, the system provides a high quality of storage service based on the tenant and virtual machine (VM) information in different virtual networks.

To clearly describe the approach, the following acronyms/terms are used:

SDN: Software Defined Networking

NV: Network Virtualization

NVE: Network Virtualization Edge—responsible for packet encapsulation and de-capsulation for the VM in the virtual network VNI: Virtual Network Identifier—used to uniquely identify the virtual network S4NV-switch: Storage for NV switch—a switch inside the storage array to make the storage products aware of the virtual network (note that the S4NV-switch can be either software-based, hardware-based, or some combination thereof)

SDN/NV controller: a controller responsible for managing the network resources in the data center to provision virtual networks to the tenants. The controller can be either distributed or centralized. In a practical system, a network virtualization platform (NVP) or network management software can be adapted to serve as the SDN/NV controller.

SDN/NV storage controller: a controller responsible for managing the storage resources and providing storage services to the tenant VMs in the virtual network.

SLA: Service Level Agreement

FIG. 1 illustrates a data center with a network virtualization-aware data storage system according to an embodiment of the invention. As shown, data center 100 comprises a plurality of host computing devices 110 (by way of example only, 110-1 and 110-2). Each host computing device has associated therewith a hypervisor 112 (by way of example only, 112-1 and 112-2) and an NVE (by way of example only, 114-1 and 114-2). Instantiated on each host computing device is a plurality of virtual machines 116 (by way of example, VM1 (116-1) and VM3 (116-3) on host computing device 110-1, and VM2 (116-2) and VM4 (116-4) on host computing device 110-2). Note that VM3 and VM4 are part of a virtual network 1, and VM1 and VM2 are part of a virtual network 2. An SDN/NV controller 102 is operatively coupled to each NVE 114.

The host computing devices 110 are connected to a data storage system 120 via a physical network represented as switch/fabric 130. The data storage system 120 comprises a plurality of storage arrays 121 (by way of example only, 121-1, 121-2, and 121-3). Each storage array has associated therewith an S4NV switch 122 (by way of example only, 122-1, 122-2, and 122-3). The S4NV switches 122 are operatively coupled to an SDN/NV storage controller 124. Note that while SDN/NV storage controller 124 is shown as wholly a part of the data storage system 120 and separate from SDN/NV controller 102, it is to be appreciated that, in alternative embodiments, some functions of each controller can be shared and otherwise distributed there between.

Since the host computing devices 110 and the storage arrays 121 are connected to the physical network 130, they can naturally communicate with each other without access control. However, with a network virtualization overlay technique, different tenants are isolated from one another in different virtual networks. For instance, VM1 and VM2 are in one virtual network, and VM3 and VM4 are in another virtual network. To achieve this, each hypervisor 112 in each host computing device 110 is configured with an NVE 114, the responsibility of which is to encapsulate/de-capsulate the packets for the VMs 116. Moreover, all NVEs 114 are controlled by the dedicated SDN/NV controller 102, such SDN/NV controller 102 can be either distributed or centralized.

Conventional storage products cannot be linked into a virtual network created in one or more host computing devices since the storage products have no knowledge of the virtual network. To resolve such an issue, embodiments of the invention provide an S4NV switch 122 to make the storage array 121 aware of the virtual networks (e.g., virtual network 1 with VM3 and VM4, and virtual network 2 with VM1 and VM2). Moreover, SDN/NV storage controller 124 controls the S4NV switches 122 and interacts with the SDN/NV controller 102 to link the virtual storage resources of the storage array into one or more virtual networks of one or more tenants, and provide customized storage services.

Advantageously, with the embedded S4NV switch approach, a data storage system is naturally aware of a created virtual network without a need for external NV aware switches, thus making the data storage system more flexible and autonomous in terms of functionality. Also, with the embedded S4NV switch approach, the data storage system is able to collect more information of the tenants in the different virtual networks, and thereby provide customized and high quality storage service.

Figure 2:
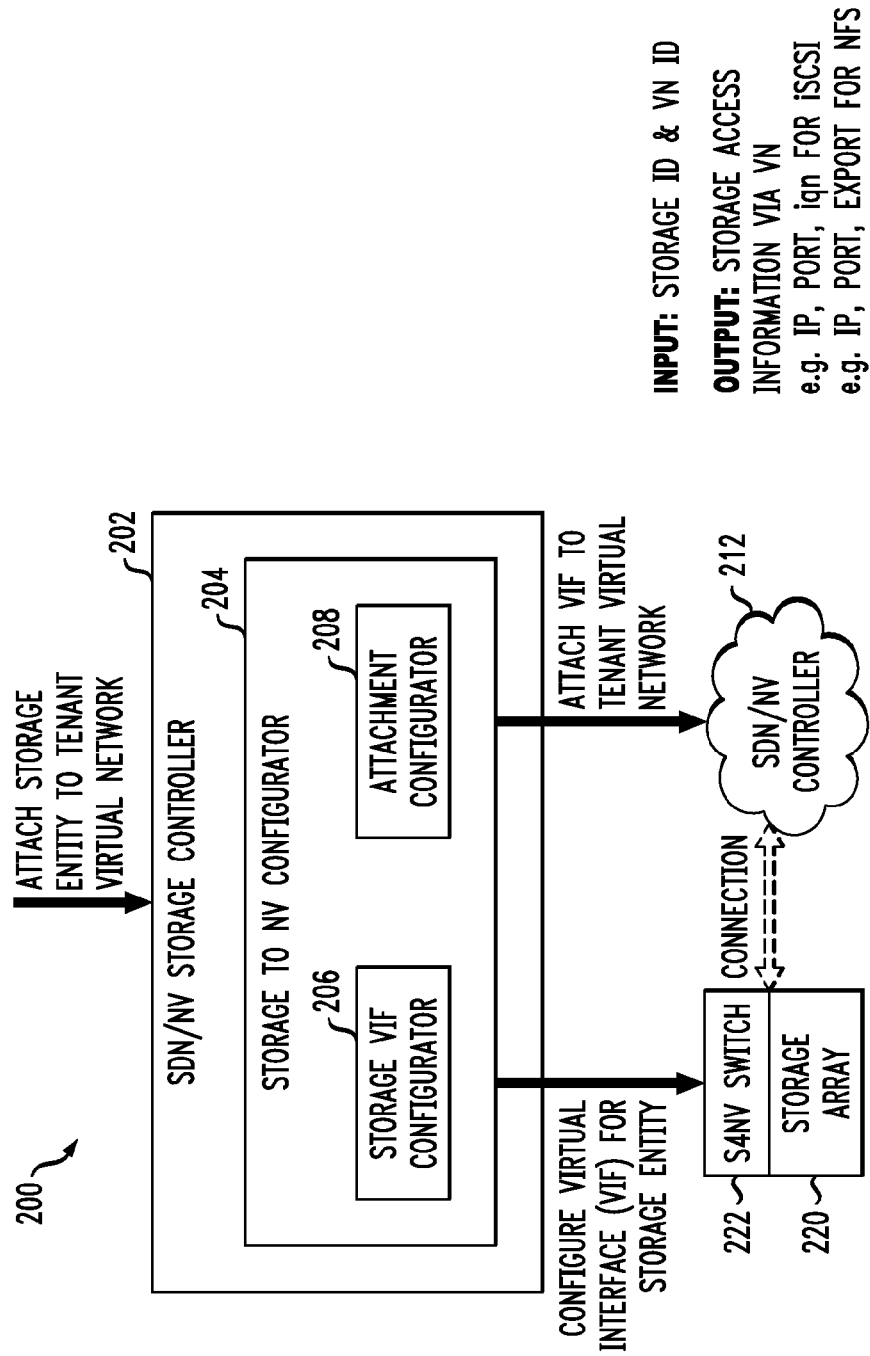
FIG. 2 illustrates a methodology for provisioning a storage input/output service to applications in a virtual network according to an embodiment of the invention.

FIG. 2 illustrates a methodology for provisioning a storage input/output service to applications in a virtual network according to an embodiment of the invention. This methodology 200 is depicted in terms of an illustrative SDN/NV storage controller 202 (an example of SDN/NV storage controller 124 in FIG. 1). As shown, SDN/NV storage controller 202 comprises a storage to NV configurator 204. The storage to NV configurator 204, itself, comprises a storage virtual interface (VIF) configurator 206 and an attachment configurator 208. Also shown in FIG. 2 is an SDN/NV controller 212 (an example of SDN/NV controller 102 in FIG. 1), a storage array 220 (an example of storage array 121 in FIG. 1) and an S4NV switch 222 (an example of S4NV switch 122 in FIG. 1).

Thus, as will be explained below, methodology 200 depicts a detailed procedure to provision storage (e.g., iSCSI, NFS) to tenant VMs in a virtual storage network. When a tenant requests a storage service (e.g., file/block service) in a virtual network, the following steps/operations occur:

1. The request is intercepted by the SDN/NV storage controller 202, which invokes an application programming interface (API) exported by the storage to NV configurator 204 to proceed with the virtual storage allocation process.

2. Upon receiving the request, the storage to NV configurator 204 utilizes the storage VIF configurator 206 to interact with the S4NV switch 222 on the corresponding storage array 220 for configuring a virtual interface (VIF) to the allocated storage entity (the virtual storage resource).

3. When the VIF is successfully created, then the storage to NV configurator 204 invokes the attachment configurator 208 to interact with the SDN/NV controller 212. The SDN/NV controller 212 attaches the VIF to the tenant virtual network, and configures the Internet Protocol (IP) address via Dynamic Host Configuration Protocol (DHCP) in one illustrative embodiment.

4. After the connection is constructed, the SDN/NV storage controller 202 forwards the virtual IP address and the relevant storage service information to the tenant. Then, the tenant can advantageously access the exported storage service (e.g., Network Attached Storage (NAS) or iSCSI target) in the tenant's own virtual network.

5. Since I/O requests in different virtual networks can be uniquely identified by a VNI, the data storage system can distinguish tenant VMs by identifier/address pairs, i.e., <VNI, virtual IP>. Advantageously, different tenants can physically share the same virtual storage resource (and/or access their own dedicated virtual storage resources). It is to be understood that a "virtual storage resource" can comprise, by way of example only, one or more logical storage units (LUNs) that are instantiated on the plurality of storage arrays of the data storage system.

With such an S4NV switch approach, more information of the tenant can be captured, and thus different tenants can be identified, and data traffic can be accurately measured to the VM level. Thus, more customized storage services can be delivered by the data storage system. Advantageously, embodiments of the invention can be utilized to: meet the I/O SLA requirements (i.e., quality-of-service or QoS) committed to tenants; provide end-to-end storage I/O QoS to each VM in a tenant network; and prioritize the storage I/O traffic with the specific requirements of different tenants.

Figure 3:
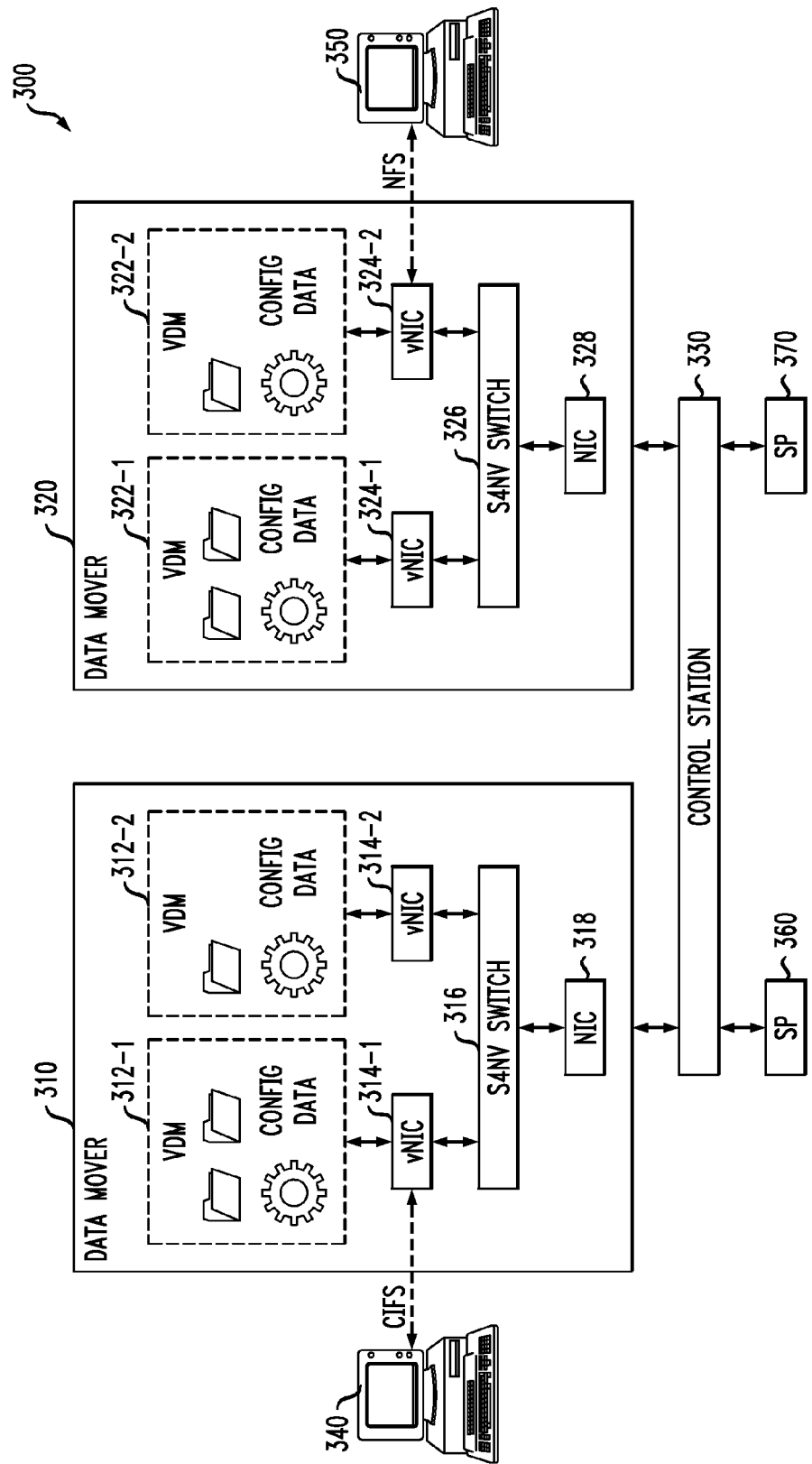
FIG. 3 illustrates a data storage system with embedded network virtualization-aware switches according to an embodiment of the invention.

FIG. 3 illustrates a data storage system 300 with embedded network virtualization-aware switches according to an embodiment of the invention. For example, the embedded S4NV switch approach can be implemented in the VNX/VNXe® storage products commercially available from EMC Corporation of Hopkinton, Mass. FIG. 3 shows the inner structure of the VNX® system with the S4NV switch functionality embedded therein to provide a file service to external clients.

In this example, the data storage system is composed of a DART (Data Access in Real Time) operating system (EMC Corporation) hosted on data movers (by way of example only, 310 and 320), control station 330, and storage processors or SP (by way of example only, 360 and 370). Each data mover as shown comprise a plurality of virtual data movers or VDM (by way of example only, 312-1 and 312-2 in data mover 310, and 322-1 and 322-2 in data mover 320), a plurality of virtual network interface cards or vNIC (by way of example only, 314-1 and 314-2 in data mover 310, and 324-1 and 324-2 in data mover 320), an S4NV switch (by way of example only, 316 in data mover 310, and 326 in data mover 320), and a network interface card or NIC (by way of example only, 318 in data mover 310, and 328 in data mover 320). As further shown, CIFS 340 is operatively coupled to vNIC 314-1, and NFS 350 is operatively coupled to vNIC 324-2.

To provide a file service to a tenant in a designated virtual network (e.g., 10.32.105.X), the administrators use Unisphere (EMC Corporation) to control the control station 330 and create a VDM (312 or 322). Then, the administrator can interact with the SDN/NV storage controller (202 in FIG. 2) to generate a vNIC (318 or 328) and interact with the SDN/NV controller (212 in FIG. 2) e.g., NVP, to generate a virtual IP address in the user's virtual network (e.g., 10.32.105.128). Then, a CIFS (340) or NFS (350) service can be built on the created VDM with the allocated IP address. In fact, the CIFS/NFS service is provisioned by the DART, which means the DART operates on the VDM. So if we want to make the VNX® system be aware of the NV network via an embedded switch but not relying on a gateway approach, the S4NV switch (e.g., open vSwitch) is added in the DART operating system.

Figure 4:
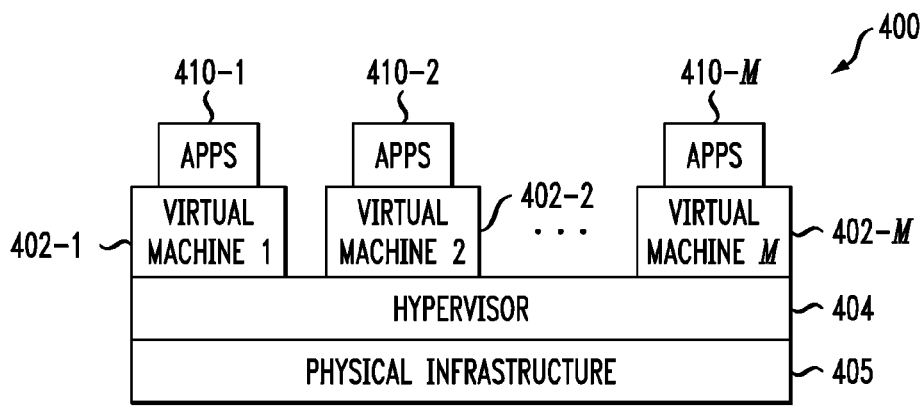
FIG. 4 illustrates a host computing device according to an embodiment of the invention.

FIG. 4 illustrates a host computing device according to an embodiment of the invention. As shown in FIG. 4, the host infrastructure 400 comprises virtual machines (VMs) 402-1, 402-2, . . . 402-M implemented using a hypervisor 404. The hypervisor 404, as mentioned above, is an example of what is more generally referred to herein as "virtualization infrastructure." The hypervisor 404 runs on physical infrastructure 405 (e.g., such as may include, but is not limited to, central processing units (CPUs) and associated memory). The host infrastructure 400 further comprises sets of applications 410-1, 410-2, . . . 410-M running on respective ones of the virtual machines 402-1, 402-2, . . . 402-M under the control of the hypervisor 404.

Although only a single hypervisor 404 is shown in the example of FIG. 4, a given embodiment of host infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 404 which, as shown in FIG. 4, is directly inserted on top of the computer hardware in order to allocate hardware resources of the physical computer (physical infrastructure 405) dynamically and transparently. The hypervisor 404 affords the ability for multiple operating systems to run concurrently on a single physical computer and share hardware resources with each other.

An example of a commercially available hypervisor platform that may be used to implement portions of the host infrastructure 400 in one or more embodiments of the invention is the VMware vSphere® which may have an associated virtual infrastructure management system such as the VMware vCenter®.

Figure 5:
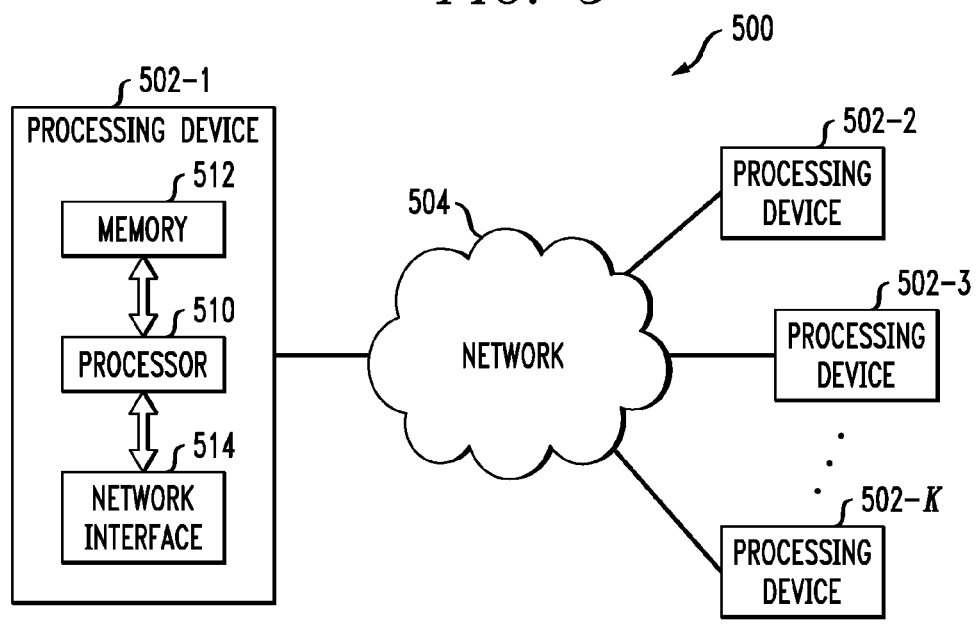
FIG. 5 illustrates a processing platform on which a data center with a network virtualization-aware data storage system is implemented according to one or more embodiments of the invention.

FIG. 5 illustrates a processing platform on which a data center (e.g., 100) with a network virtualization-aware data storage system (e.g., 120) is implemented according to one or more embodiments of the invention. The processing platform 500 in this embodiment comprises a plurality of processing devices denoted 502-1, 502-2, 502-3, . . . 502-K, which communicate with one another over a network 504. One or more of the elements of data center 100 may therefore each run on one or more computers or other processing platform elements, each of which may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodology 300. One skilled in the art would be readily able to implement such software given the teachings provided herein. Other examples of processor-readable storage media embodying embodiments of the invention may include, for example, optical or magnetic disks.

Also included in the processing device 502-1 is network interface circuitry 514, which is used to interface the processing device with the network 504 and other system components. Such circuitry may comprise conventional transceivers of a type well known in the art.

The other processing devices 502 of the processing platform 500 are assumed to be configured in a manner similar to that shown for processing device 502-1 in the figure.

The processing platform 500 shown in FIG. 5 may comprise additional known components such as batch processing systems, parallel processing systems, physical machines, virtual machines, virtual switches, storage volumes, logical units, etc. Again, the particular processing platform shown in FIG. 5 is presented by way of example only, and system 100 of FIG. 1 may include additional or alternative processing platforms, as well as numerous distinct processing platforms in any combination.

Note also that the components of FIGS. 2 and 3 may also be implemented in a processing platform such as the one depicted in FIG. 5.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, in accordance with embodiments described herein, virtual storage resources can be directly provisioned to the applications (executed by one or more VMs on a host computing device) in a virtual network, focusing on the management work related to attaching/detaching one or more virtual storage resources to SDN/NV. Smart data service can be delivered. With the embedded switch inside the storage array, more information of the tenants can be captured (e.g., VNI, virtual IP address), thus the value-added services (e.g., backup, archive, high availability, caching) to the tenants inside the virtual network can be provisioned. Also, the S4NV switch approach can help the tenants to seamlessly migrate an entire production system into a virtualized environment without changing the configurations of both the application and storage network since there is no change of the logical data path for storage I/O.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A data storage system, comprising:
at least one network virtualization-aware switch;
at least one storage array operatively coupled to the network virtualization-aware switch, wherein the storage array is operatively coupled to at least one host computing device, and wherein the host computing device instantiates at least one virtual machine in at least one virtual network; and
at least one controller operatively coupled to the network virtualization-aware switch, wherein the controller is configured to link the storage array with the virtual machine of the virtual network through the network virtualization-aware switch and to receive a storage service request from the virtual machine associated with the virtual network and, in response to the request, the controller is configured to allocate at least one virtual storage resource instantiated by the storage array such that the virtual storage resource is accessible by the virtual machine through the network virtualization-aware switch.

2. The data storage system of claim 1, wherein the controller is configured to interact with the network virtualization-aware switch to configure a virtual interface between the virtual storage resource of the storage array and the virtual network.

3. The data storage system of claim 2, wherein the controller is configured to cause attachment of the virtual interface to the virtual network.

4. The data storage system of claim 3, wherein the controller is configured to forward address information for the virtual storage resource to the virtual machine to allow the virtual machine to access the virtual storage resource.

5. The data storage system of claim 4, wherein the network virtualization-aware switch is configured to recognize an identifier associated with the virtual network and the address information for the virtual storage resource from input/output requests received by the switch.

6. The data storage system of claim 1, wherein the virtual network is associated with a first tenant.

7. The data storage system of claim 6, wherein the host computing device instantiates at least another virtual machine in a second virtual network associated with a second tenant, and wherein the controller is configured to allocate at least one virtual storage resource instantiated by the storage array such that the virtual storage resource is accessible by the second virtual network through the network virtualization-aware switch.

8. The data storage system of claim 7, wherein the network virtualization-aware switch is configured to differentiate input/output requests associated with the first tenant and the second tenant.

9. The data storage system of claim 7, wherein the virtual storage resource allocated to the first tenant is different than the virtual storage resource allocated to the second tenant.

10. The data storage system of claim 7, wherein the virtual storage resource allocated to the first tenant is the same virtual storage resource allocated to the second tenant.

11. A method, comprising:
enabling at least one network virtualization-aware switch embedded in a data storage system, wherein the data storage system comprises at least one storage array operatively coupled to at least one host computing device, and wherein the host computing device instantiates at least one virtual machine in at least one virtual network;
receiving a storage service request from the virtual machine associated with the virtual network; and
allocating at least one virtual storage resource instantiated by the storage array in response to the request such that the virtual storage resource instantiated by the storage array is linked with the virtual machine of the virtual network through the network virtualization-aware switch.

12. The method of claim 11, further comprising the step of configuring the network virtualization-aware switch to recognize an identifier associated with the virtual network and address information for the virtual storage resource from input/output requests received by the switch.

13. The method of claim 11, wherein the virtual network is associated with a first tenant.

14. The method of claim 13, wherein the host computing device instantiates at least another virtual machine in a second virtual network associated with a second tenant.

15. The method of claim 14, further comprising the step of allocating at least one virtual storage resource instantiated by the storage array such that the virtual storage resource is accessible by the second virtual network through the network virtualization-aware switch.

16. The method of claim 15, further comprising the step of configuring the network virtualization-aware switch to differentiate input/output requests associated with the first tenant and the second tenant.

17. An article of manufacture comprising a processor-readable storage medium having encoded therein executable code of one or more software programs, wherein the one or more software programs when executed by the at least one processing device implement the steps of the method of claim 11.

18. A data center, comprising:
at least one host computing device, wherein the host computing device instantiates at least one virtual machine in at least one virtual network; and
a data storage system operatively coupled to the host computing device and comprising:
at least one network virtualization-aware switch;
at least one storage array operatively coupled to the network virtualization-aware switch; and
at least one controller operatively coupled to the network virtualization-aware switch, wherein the controller is configured to link the storage array with the virtual machine of the virtual network through the network virtualization-aware switch and to receive a storage service request from the virtual machine associated with the virtual network and, in response to the request, the controller is configured to allocate at least one virtual storage resource instantiated by the storage array such that the virtual storage resource is accessible by the virtual machine through the network virtualization-aware switch.

19. The data center of claim 18, wherein the virtual network is associated with a first tenant.

20. The data center of claim 19, wherein the host computing device instantiates at least another virtual machine in a second virtual network associated with a second tenant, and wherein the controller is configured to allocate at least one virtual storage resource instantiated by the storage array such that the virtual storage resource is accessible by the second virtual network through the network virtualization-aware switch.

* * * * *